US008555379B1

(12) United States Patent
Whitehouse et al.

(10) Patent No.: US 8,555,379 B1
(45) Date of Patent: Oct. 8, 2013

(54) METHOD AND APPARATUS FOR MONITORING COMMUNICATIONS FROM A COMMUNICATIONS DEVICE

(75) Inventors: Oliver Whitehouse, Belmont (GB); Oliver Friedrichs, Woodside, CA (US); Elias Levy, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 1111 days.

(21) Appl. No.: 11/864,810

(22) Filed: Sep. 28, 2007

(51) Int. Cl.
*H04L 29/06* (2006.01)

(52) U.S. Cl.
USPC ............................................. 726/22; 726/24

(58) Field of Classification Search
USPC ...................................................... 726/22, 24
See application file for complete search history.

(56) References Cited

U.S. PATENT DOCUMENTS

| 6,052,709 | A  | * | 4/2000  | Paul ............................... 709/202 |
| 7,673,342 | B2 | * | 3/2010  | Hursey et al. .................. 726/24 |
| 7,950,060 | B1 | * | 5/2011  | Kennedy et al. ................ 726/24 |
| 2002/0095607 | A1 | * | 7/2002  | Lin-Hendel ..................... 713/201 |
| 2002/0194489 | A1 | * | 12/2002 | Almogy et al. ................ 713/200 |
| 2003/0120950 | A1 | * | 6/2003  | Hunt .............................. 713/200 |
| 2003/0154394 | A1 | * | 8/2003  | Levin ............................. 713/200 |
| 2004/0111632 | A1 | * | 6/2004  | Halperin ........................ 713/200 |
| 2006/0015561 | A1 | * | 1/2006  | Murphy et al. ................ 709/206 |
| 2006/0075493 | A1 | * | 4/2006  | Karp et al. ..................... 726/22 |
| 2006/0282890 | A1 | * | 12/2006 | Gruper et al. .................. 726/22 |
| 2007/0101430 | A1 | * | 5/2007  | Raikar ............................ 726/24 |
| 2007/0289018 | A1 | * | 12/2007 | Steeves et al. ................. 726/24 |
| 2007/0299915 | A1 | * | 12/2007 | Shraim et al. ................. 709/206 |
| 2008/0052359 | A1 | * | 2/2008  | Golan et al. ................... 709/206 |

* cited by examiner

*Primary Examiner* — Michael Pyzocha
(74) *Attorney, Agent, or Firm* — Wilmer Cutler Pickering Hale and Dorr LLP

(57) ABSTRACT

A method and apparatus for monitoring communications from a communications device comprising monitoring communications from a communications device by storing a data acquisition address in a contact list of the communications device that identifies a location of a monitoring device. Further, when malicious software uses the contact list to send messages, a message is sent using the malicious software to the monitoring device using the data acquisition address.

18 Claims, 3 Drawing Sheets

METHOD AND APPARATUS FOR MONITORING COMMUNICATIONS FROM A COMMUNICATIONS DEVICE

BACKGROUND OF THE INVENTION

1. Field of the Invention

Embodiments of the present invention generally relate to network computing and, more particularly, to a method and apparatus for monitoring communications from a communications device.

2. Description of the Related Art

To protect computers connected to the Internet, various companies utilize network monitoring systems to identify threats propagating across the Internet. One such system used by Symantec Corporation is the Attack Quarantine Systems (AQS) that comprises a plurality of monitoring devices positioned throughout the world to collect network intelligence. The monitoring devices passively and actively receive data as communications flow through the Internet. Traditionally, a network monitoring system comprises numerous computers (monitoring devices) that have been deliberately unguarded in an effort to receive and collect malicious software for evaluation. Data sent to the monitoring devices can contain hostile programs such as malicious software agents, adware, spyware, viruses, and the like. Monitoring devices are used to identify new hostile programs and/or monitor the propagation of existing hostile programs. Monitoring devices are also used to monitor recent attacks on user computers such as phishing, SPAM, denial of service, viruses, and the like.

Another form of attack springs from infiltrating trusted relationships and exploiting the relationships. These attacks load malicious software onto a communications device (e.g., computer, cell phone, PDA, and the like) to further their propagation. Such attacks may require no user interaction to spread through a network. The software accesses a contact list within the device and sends malicious/unwanted information such as SPAM, duplicate copies of the malicious software, and the like to all the contacts in the contact list. Since these attacks are within the trusted relationship and the attacks do not flow indiscriminately through the Internet, a monitoring device will not intercept the communication. Thus, a trusted relationship form of attack may go undetected for a substantial amount of time.

Accordingly, there exists a need for a method and apparatus for forming a trusted relationship and monitoring communications from a communications device within the trusted relationship.

SUMMARY OF THE INVENTION

The present invention generally relates to a method and apparatus for monitoring communications from a communications device. One embodiment of the present invention is a method for monitoring communications from a communications device by forming a trusted relationship comprising storing a data acquisition address in a contact list of the communications device that identifies a location of a monitoring device. Further, when malicious software uses the contact list to send messages, a message is sent using the malicious software to the monitoring device at the data acquisition address.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means at least one.

DETAILED DESCRIPTION

Figure 1:
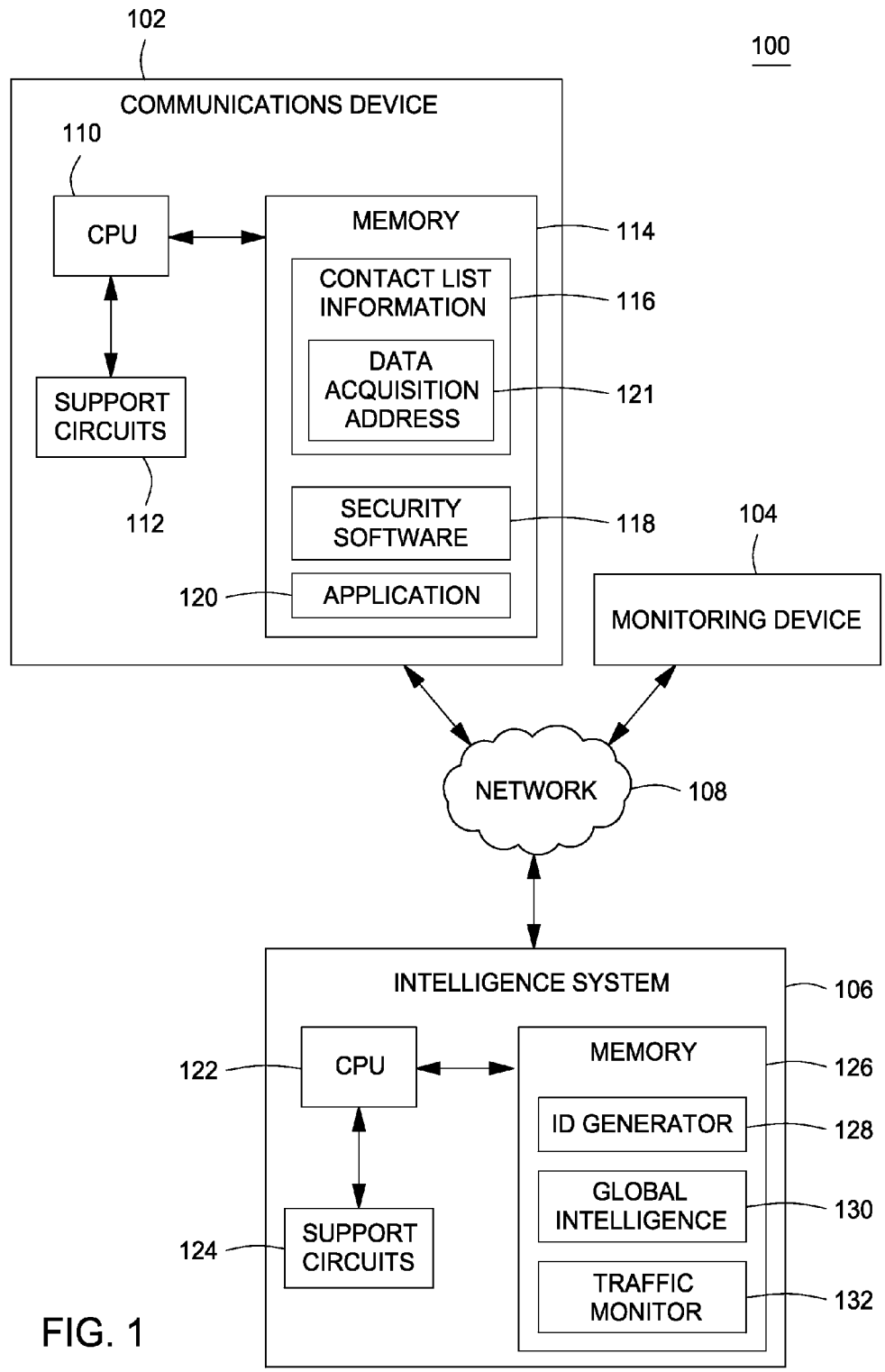
FIG. 1 is a block diagram of a computer system according to various embodiments of the present invention.

FIG. 1 is a block diagram of a computer system 100 according to various embodiments of the present invention. The computer system 100 comprises a communications device 102, a monitoring device 104, and an intelligence system 106 running several applications and connected to a network 108 that generally forms a portion of the Internet which may comprise various sub-networks such as Ethernet networks, local area networks, wide area networks, wireless networks, and the like. Those skilled in the art will appreciate that the hardware depicted in the FIG. 1 may vary from one computer system to another. For example, other peripheral devices, such as optical disk drives, graphics card, data storage devices, various other input devices, peripherals and the like, may also be used in addition to or in place of the hardware depicted. The network 108 provides access to the communications device 102 for various applications located on monitoring device 104 and intelligence system 106.

The communication device 102 comprises, without limitation, a CPU 110, support circuits 112, and a memory 114. The CPU 110 may be one or more of any commercially available microprocessors or microcontrollers. The support circuits 112 comprise circuits and devices that are used in support of the operation of the CPU 110. Such support circuits include, for example, one or more of cache, input/output circuits, system bus, PCI bus, clock circuits, power supplies or the like.

The memory 114 may comprise random access memory, read only memory, optical memory, disk drives, removable memory, and the like. Various types of software processes or modules and information are resident within the memory 114. For example, various processes such as an Operating System (OS) kernel (not shown), a software library (not shown), and software modules, for example, modules 116, 118 and 120, are illustrated as being resident in the memory 114.

The module 116 comprises contact list information (i.e., contact list that may be resident on a computer, cell phone, PDA, and the like). In accordance with certain aspects of the present invention, a data acquisition address 121 of the monitoring device 104 is inserted into the contact list information 116. The data acquisition address 121 is non-deterministic (i.e., it cannot be identified as the address of a monitoring device or part of a security service). In other words, the domain name won't resolve to a security service domain. An address generator, such as an ID generator 128, generates the non-deterministic data acquisition addresses and distributes them to communications devices such as the communications device 102. The data acquisition address 121 resembles a "real" contact for a specific application (e.g., mail, SMS, instant messaging, etc.). The data acquisition address 121 may be a telephone number, e-mail address, buddy list name, and so on. The data acquisition address 121 would never be used except when malicious software is sending a message to substantially all or all addresses in the contact list.

The monitoring device 104 is comprised of a computer that is positioned to collect network intelligence. The monitoring device passively receives data as communications flow through the Internet. The security software module 118 may be configured to receive and process intelligence data from an intelligence system (e.g., AQS). Application module 120 may be any application of interest to the user of the communications device 102.

The intelligence system 106 comprises, also without limitation, a CPU 122, support circuits 124, and a memory 126. The CPU 124 may be one or more of any commercially available microprocessors or microcontrollers. The support circuits 124 comprise circuits and devices that are used in support of the operation of the CPU 122. Such support circuits include, for example, one or more of cache, input/output circuits, system bus, PCI bus, clock circuits, power supplies or the like.

The memory 126 may comprise random access memory, read only memory, optical memory, disk drives, removable memory, and the like. Various types of software processes or modules and information are resident within the memory 126. For example, various processes such as an Operating System (OS) kernel (not shown), a software library (not shown), and software modules, for example, ID generator modules 128, global intelligence module 130, and traffic monitor module 132 are illustrated as being resident in the memory 126.

According to various embodiments of the current invention, the traffic monitor module 132 and the global intelligence module 130 may be used to analyze communication traffic data sent to a monitoring device located at a data acquisition address. Normally, data should not be sent from a user communications device to the monitoring device located at the data acquisition address. If a communication is sent to the data acquisition address, then most likely the communication device has a security breach and/or a hostile program is using the contact list to send messages. An intelligence system 106 (e.g., AQS of Symantec Corporation) can be used to analyze this communication traffic to the monitoring device and identify the cause (e.g., malware, virus, SPAM, phish, etc.). The intelligence system 106 can also produce global intelligence based on this analysis and distribute the global intelligence to security applications running on many communications devices.

Figure 2:
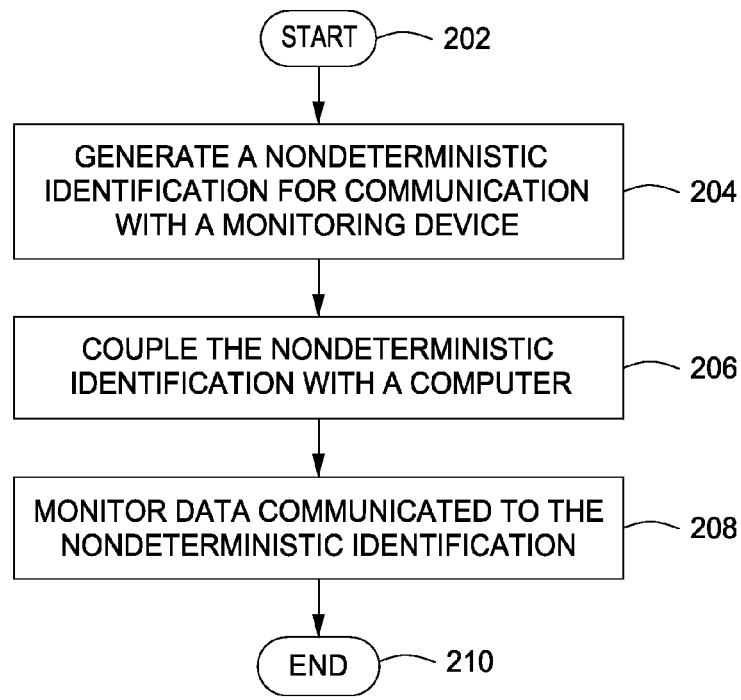
FIG. 2 is a flow chart of a method for monitoring communications from a communications device according to various embodiments of the present invention.

FIG. 2 is a flow diagram of a method 200 that depicts certain aspects of various embodiments of the present invention. The Method 200 begins at step 202. In step 204, a non deterministic identification (i.e., data acquisition address) is generated for communication with a monitoring device. The non deterministic identification may be generated by a software module such as the ID generator 128 which is resident on the intelligence system 106. In step 206, the non deterministic identification is coupled to a communication device (e.g., device 102). The computer may be a monitoring device in accordance with the present invention. Then, at step 208, data sent to the computer located at the data acquisition address is monitored. For example, the traffic monitor 132 may monitor data sent from the communications device 102 to monitoring device 104, located at a data acquisition address generated by the ID generator 128. The method 200 ends at step 210.

Figure 3:
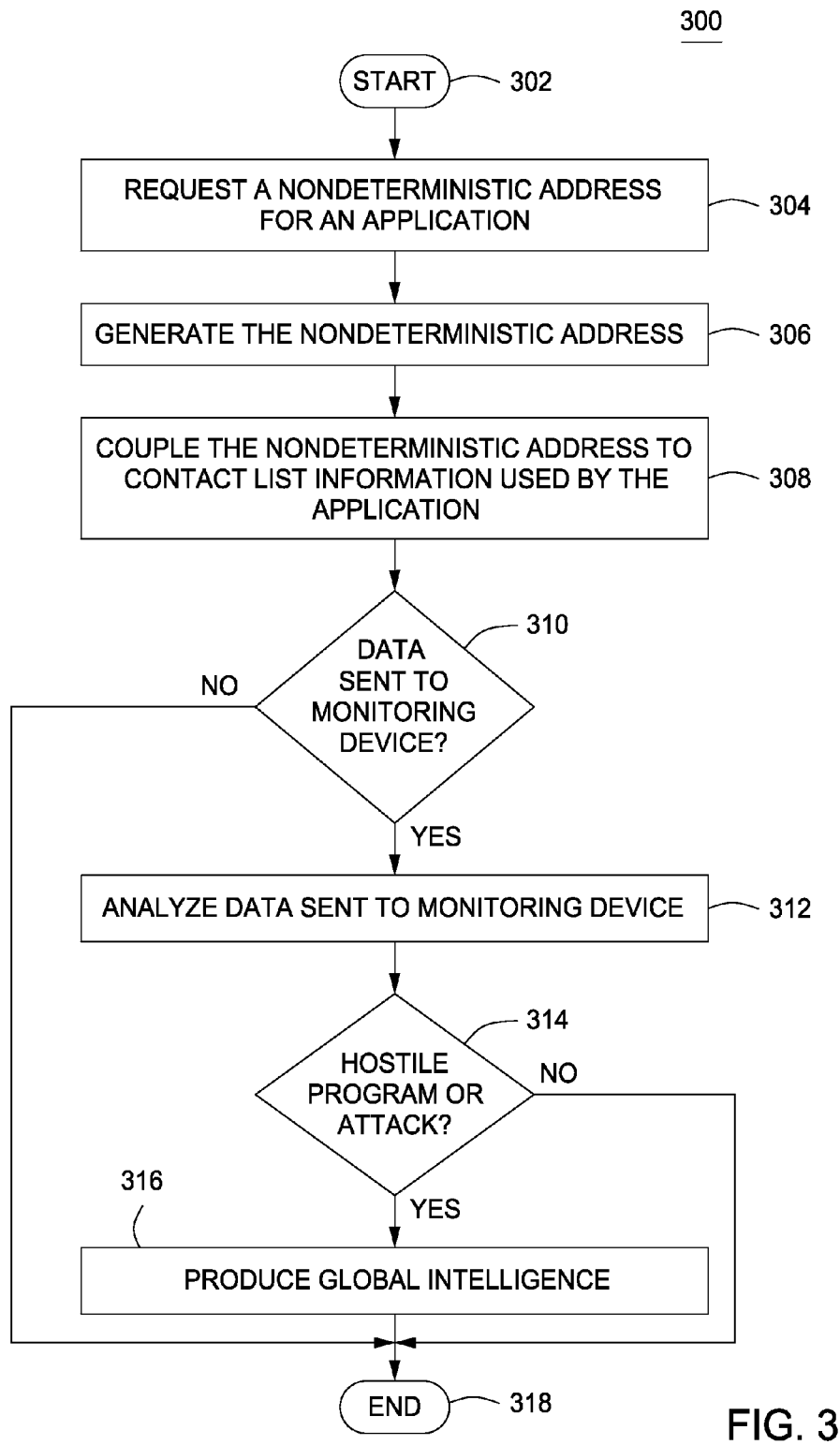
FIG. 3 is another flow chart of a method for monitoring communications from a communications device according to various embodiments of the present invention.

FIG. 3 is a flow diagram of a method 300 that depicts certain aspects of other embodiments of the present invention. The method 300 begins at step 302 and proceeds to step 304 wherein a request for a non deterministic address is issued for an application. The request may be issued from a security software module (e.g., the security software module 118), which is resident on the communication device 102. In response to the request, a non deterministic address (i.e., data acquisition address) is generated in step 306. Next, in step 308, the non deterministic address is coupled to (i.e., inserted into) the contact list information used by the application. At step 310, it ascertained whether data is sent from the communication device, on which the application is running, to the non deterministic address. If no data is sent, option "NO", the method 300 ends at step 318. If data is sent, option "YES", the data is analyzed in step 312. In decision step 314, it is determined whether the data sent is a hostile program or attack. If the data sent is a hostile program or attack, option "YES", a system such as the intelligence system 106 produces global intelligence in step 316 and the method ends in step 318. If, in step 314, it is determined that the data which sent is not a hostile program or attack, the method 300 again ends at step 318.

Figure 4:
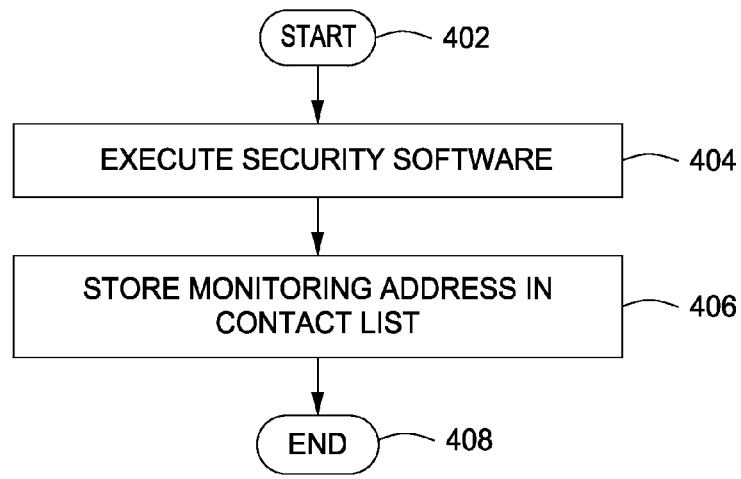
FIG. 4 is yet another flow chart for monitoring communications from a communications device according to various embodiments of the present invention.

FIG. 4 is a flow diagram of a method 400 that depicts other aspects of embodiments of the present invention. The method begins at step 402 and proceeds to step 404 wherein security software such as the security software module 118 is executed on the communication device. At step 406, the address of a monitoring device (e.g., monitoring device 104) is stored in a contact list (e.g. contact list information module 116). Method 400 ends at step 408.

One embodiment of the present invention is an apparatus for monitoring communications from a communications device comprising a computer system such as the system 100.

Still another embodiment of the present invention is a system for monitoring communications from a communications device, comprising a plurality of communications devices such as the communications device 102. Each communications device comprises a memory having contact list information, wherein the contact list information comprises at least one data acquisition address of a monitoring device. Further, the system comprises an intelligence system such as the intelligence system 106 which further comprises a monitoring device for monitoring data communicated from any of the plurality communications devices to the data acquisition address.

While the foregoing is directed to embodiments of the present invention, other and further embodiments of the invention may be devised without departing from the basic scope thereof, and the scope thereof is determined by the claims that follow.

What is claimed is:

1. A method for monitoring communications from a communications device, comprising:
    generating a non-deterministic data acquisition address in response to a request from security software on the communications device;
    storing, using at least one computer processor, the non-deterministic data acquisition address in a contact list of the communications device that identifies a location of a monitoring device;
    when malicious software uses the contact list to send messages, sending a message using the malicious software to the monitoring device using the non-deterministic data acquisition address;
    identifying a cause of the message as at least one of malware, SPAM, and a phishing attempt;
    analyzing content of the message based on a receipt of the message at the non-deterministic data acquisition address to determine whether data of the message is a hostile program;
    identifying the data of the message as a hostile program;
    generating global intelligence based on the identification of the hostile program; and
    distributing the global intelligence to a plurality of communications devices, wherein distribution of the global intelligence is independent of an indicia of infection of a global intelligence recipient.

2. The method of claim 1, wherein the non-deterministic data acquisition address comprises an address having a format matching an address format used by a communication application.

3. The method of claim 2, wherein the non-deterministic data acquisition address defines at least one of a phone number, an email address or an instant messenger username.

4. The method of claim 1, further comprising analyzing messages communicated to the data acquisition address.

5. The method of claim 1, further comprising identifying a communication to the data acquisition address as indicia of a security breach.

6. The method of claim 5, further comprising storing data acquisition addresses upon a plurality of communication devices and producing global security intelligence using messages sent to the plurality of data acquisition addresses.

7. The method of claim 6, further comprising distributing the global intelligence to security applications running on the plurality of communication devices, wherein distribution of the global intelligence is independent of an indicia of infection of a global intelligence recipient.

8. The method of claim 1, wherein the client device comprises a cell phone.

9. The method of claim 1, wherein the non-deterministic data acquisition address comprises an address which can not be identified as the address of a monitoring device and can not be identified as the address of a security service.

10. An apparatus for monitoring communications from a communications device, comprising:
    a data acquisition address generator configured to generate a non-deterministic data acquisition address in response to a request from security software on the communications device;
    a memory for storing the non-deterministic data acquisition address within a contact list used by communication software of the communications device, where the data acquisition address is used by malicious software to send messages;
    a monitoring device for receiving messages communicated to the data acquisition address, and
    a global intelligence module configured to identify a cause of the message as at least one of malware, SPAM, and a phishing attempt, wherein the global intelligence module is further configured to:
        analyze content of a message based on a receipt of the message at the non-deterministic data acquisition address to determine whether data of the message is a hostile program;
        identify the data of the message as a hostile program;
        generate global intelligence based on the identification of the hostile program; and
        distribute the global intelligence to a plurality of communications devices, wherein distribution of the global intelligence is independent of an indicia of infection of a global intelligence recipient.

11. The apparatus of claim 10, further comprising an intelligence system for analyzing the received messages to determine communication security intelligence.

12. The apparatus of claim 10, wherein the monitoring device is further configured to receive messages communicated to a plurality of non-deterministic data acquisition addresses and produce global security intelligence using messages sent to the plurality of non-deterministic data acquisition addresses.

13. The apparatus of claim 12, further comprising a global intelligence module configured to distribute the global intelligence to security applications running on the plurality of communication devices, wherein distribution of the global intelligence is independent of an indicia of infection of a global intelligence recipient.

14. The apparatus of claim 10, wherein the communications device comprises a cell phone.

15. A system for monitoring communications from a communications device, comprising:
    a plurality of communications devices, each communications device comprising:
        a memory having contact list information, wherein the contact list information comprises at least one non-deterministic data acquisition address of a monitoring device; and
    an intelligence system, comprising:
        a data acquisition address generator configured to generate a non-deterministic data acquisition address in response to a request from security software on at least one of the communications devices;
        a monitoring device configured to monitor data communicated from any of the plurality communications devices to the non-deterministic data acquisition address; and
        a global intelligence module configured to identify a cause of the message as at least one of malware, SPAM, and a phishing attempt, wherein the global intelligence module is further configured to:
        analyze content of a message based on a receipt of the message at the non-deterministic data acquisition address to determine whether data of the message is a hostile program;
        identify the data of the message as a hostile program;
        generate global intelligence based on the identification of the hostile program; and
        distribute the global intelligence to a plurality of communications devices, wherein distribution of the global intelligence is independent of an indicia of infection of a global intelligence recipient.

16. The system of claim 15, wherein the memory is further configured to store non-deterministic data acquisition addresses for a plurality of communication devices and wherein the intelligence system is further configured to produce global security intelligence using messages sent to the plurality of non-deterministic data acquisition addresses.

17. The system of claim 16, wherein the intelligence system is further configured to distribute the global intelligence to security applications running on the plurality of communication devices, wherein distribution of the global intelligence is independent of an indicia of infection of a global intelligence recipient.

18. The system of claim 15, wherein at least one of the plurality of communications devices comprises a cell phone.

* * * * *